United States Patent
Monden et al.

(10) Patent No.: US 10,581,246 B2
(45) Date of Patent: Mar. 3, 2020

(54) VOLTAGE-FLUCTUATION SUPPRESSION DEVICE AND METHOD

(71) Applicants: Kabushiki Kaisha Toshiba, Minato-ku (JP); Toshiba Energy Systems & Solutions Corporation, Kawasaki-shi (JP)

(72) Inventors: Yukitaka Monden, Kawasaki (JP); Yuji Watanabe, Yokohama (JP)

(73) Assignees: Kabushiki Kaisha Toshiba, Minato-ku (JP); Toshiba Energy Systems & Solutions Corporation, Kawasaki-shi (JP)

( * ) Notice: Subject to any disclaimer, the term of this patent is extended or adjusted under 35 U.S.C. 154(b) by 201 days.

(21) Appl. No.: 15/756,178

(22) PCT Filed: Sep. 3, 2015

(86) PCT No.: PCT/JP2015/075117
§ 371 (c)(1),
(2) Date: Feb. 28, 2018

(87) PCT Pub. No.: WO2017/037925
PCT Pub. Date: Mar. 9, 2017

(65) Prior Publication Data
US 2018/0248373 A1    Aug. 30, 2018

(51) Int. Cl.
*H02J 3/18*        (2006.01)
*H02M 7/537*    (2006.01)
(Continued)

(52) U.S. Cl.
CPC .............. *H02J 3/18* (2013.01); *G05B 19/042* (2013.01); *H02J 3/12* (2013.01); *H02J 3/24* (2013.01);
(Continued)

(58) Field of Classification Search
CPC ........ H02J 3/04; H02J 3/06; H02J 3/08; H02J 3/12; H02J 3/383; H02J 3/16; H02J 3/18;
(Continued)

(56) References Cited

U.S. PATENT DOCUMENTS

| | | | |
|---|---|---|---|
| 5,446,645 A | * | 8/1995 | Shirahama ................ H02J 3/46 307/58 |
| 6,172,488 B1 | | 1/2001 | Mizutani et al. |

(Continued)

FOREIGN PATENT DOCUMENTS

| | | |
|---|---|---|
| JP | 9-201072 A | 7/1997 |
| JP | 11-89244 A | 3/1999 |

(Continued)

OTHER PUBLICATIONS

International Search Report dated Nov. 17, 2015 in PCT/JP2015/075117 filed Sep. 3, 2015.

(Continued)

*Primary Examiner* — Yusef A Ahmed
(74) *Attorney, Agent, or Firm* — Oblon, McClelland, Maier & Neustadt, L.L.P.

(57) ABSTRACT

When a voltage-fluctuation suppression device suppresses, for input/output of connected power between a first power grid, or a commercial power grid, and a second power grid including a power generation device and grid-connected to the first power grid, voltage fluctuations in the first power grid, a control unit includes a voltage allowable range computing unit, controls a ratio between active and reactive power output by the voltage-fluctuation suppression device to be equal to a ratio between active and reactive power of power flowing between the first and second power grids, and controls the ratio between the active and reactive power output by the voltage-fluctuation suppression device to be (Continued)

equal to the ratio between the active and reactive power of power flowing between the first and second power grids.

4 Claims, 7 Drawing Sheets

(51) Int. Cl.
*H02J 3/32* (2006.01)
*H02J 3/46* (2006.01)
*H02J 3/12* (2006.01)
*H02M 7/44* (2006.01)
*G05B 19/042* (2006.01)
*H02J 3/24* (2006.01)
*H02J 13/00* (2006.01)
*H02M 1/32* (2007.01)
*G05F 1/10* (2006.01)
*G05F 1/70* (2006.01)

(52) U.S. Cl.
CPC ............. *H02J 3/32* (2013.01); *H02J 3/46* (2013.01); *H02J 13/0006* (2013.01); *H02M 7/44* (2013.01); *H02M 7/537* (2013.01); *G05B 2219/2639* (2013.01); *G05F 1/10* (2013.01); *G05F 1/70* (2013.01); *H02M 1/32* (2013.01); *Y02E 40/30* (2013.01); *Y02E 40/74* (2013.01); *Y04S 10/22* (2013.01)

(58) Field of Classification Search
CPC ....... H02J 3/24; H02J 3/32; H02J 3/46; G05F 1/70; G05F 1/10; G05F 5/00; H02M 1/32; H02M 1/36; H02M 7/44
See application file for complete search history.

(56) References Cited

U.S. PATENT DOCUMENTS

| | | | | |
|---|---|---|---|---|
| 6,359,423 | B1* | 3/2002 | Noro | H02J 3/12 |
| | | | | 323/207 |
| 6,545,887 | B2* | 4/2003 | Smedley | H02J 3/01 |
| | | | | 363/44 |
| 2001/0012211 | A1* | 8/2001 | Hasegawa | H02J 3/16 |
| | | | | 363/131 |
| 2002/0039299 | A1* | 4/2002 | Nishimura | H02J 3/01 |
| | | | | 363/39 |
| 2008/0106099 | A1* | 5/2008 | Ichinose | F03D 7/0284 |
| | | | | 290/44 |
| 2011/0107123 | A1* | 5/2011 | Nishimura | H02J 3/32 |
| | | | | 713/300 |
| 2012/0262957 | A1* | 10/2012 | Yamada | H02J 3/01 |
| | | | | 363/41 |
| 2013/0134779 | A1* | 5/2013 | Watanabe | G05F 1/70 |
| | | | | 307/24 |
| 2013/0176751 | A1* | 7/2013 | Olea | H02P 9/105 |
| | | | | 363/16 |
| 2013/0234521 | A1* | 9/2013 | Eom | H02J 3/18 |
| | | | | 307/66 |
| 2013/0328398 | A1* | 12/2013 | Kanao | H02J 3/1814 |
| | | | | 307/23 |
| 2015/0008743 | A1* | 1/2015 | Kimura | H02J 3/32 |
| | | | | 307/52 |
| 2015/0077068 | A1* | 3/2015 | Naoi | H02J 3/28 |
| | | | | 323/205 |
| 2015/0155712 | A1* | 6/2015 | Mondal | H02J 3/1857 |
| | | | | 307/23 |
| 2015/0270787 | A1* | 9/2015 | Fujisaki | H02M 1/08 |
| | | | | 363/41 |
| 2015/0349387 | A1* | 12/2015 | Inaba | H01M 10/44 |
| | | | | 700/297 |
| 2016/0149413 | A1* | 5/2016 | Sugimoto | H02J 3/1842 |
| | | | | 307/20 |
| 2016/0204691 | A1* | 7/2016 | Okuda | H02J 3/383 |
| | | | | 363/55 |
| 2016/0274607 | A1 | 9/2016 | Kudo et al. | |
| 2018/0123388 | A1* | 5/2018 | Itaya | H02J 3/12 |
| 2019/0081369 | A1* | 3/2019 | Monden | H01M 10/482 |
| 2019/0296551 | A1* | 9/2019 | Kawachi | H02J 3/16 |
| 2019/0334352 | A1* | 10/2019 | Sugimoto | H02J 3/46 |

FOREIGN PATENT DOCUMENTS

| | | | |
|---|---|---|---|
| JP | 11-318032 | A | 11/1999 |
| JP | 2000-308349 | A | 11/2000 |
| JP | 2001-45663 | A | 2/2001 |
| JP | 2001-197668 | A | 7/2001 |
| JP | 2002-335636 | A | 11/2002 |
| JP | 2004-336888 | A | 11/2004 |
| JP | 2006-67760 | A | 3/2006 |
| JP | 2006-246699 | A | 9/2006 |
| JP | 2006-246700 | A | 9/2006 |
| JP | 2007-104899 | A | 4/2007 |
| JP | 2007-129845 | A | 5/2007 |
| JP | 2007129845 | A * | 5/2007 |
| JP | 2007-151392 | A | 6/2007 |
| JP | 2010-17079 | A | 1/2010 |
| JP | 2011-24386 | A | 2/2011 |
| JP | 2012-19667 | A | 1/2012 |
| JP | 2012019667 | A * | 1/2012 |
| JP | 2012-200111 | A | 10/2012 |
| JP | 2012-254018 | A | 12/2012 |
| JP | 2014-57393 | A | 3/2014 |
| JP | 5633871 | B1 | 12/2014 |
| JP | 2015-61331 | A | 3/2015 |
| JP | 2016-77114 | A | 5/2016 |
| KR | 10-2014-0098431 | A | 8/2014 |

OTHER PUBLICATIONS

International Preliminary Report on Patentability dated Jan. 23, 2018 in corresponding PCT/JP2015/075117 filed Sep. 3, 2015 (English translation only).
Extended Search Report dated Dec. 10, 2018 in European Patent Application No. 15903044.4.

* cited by examiner

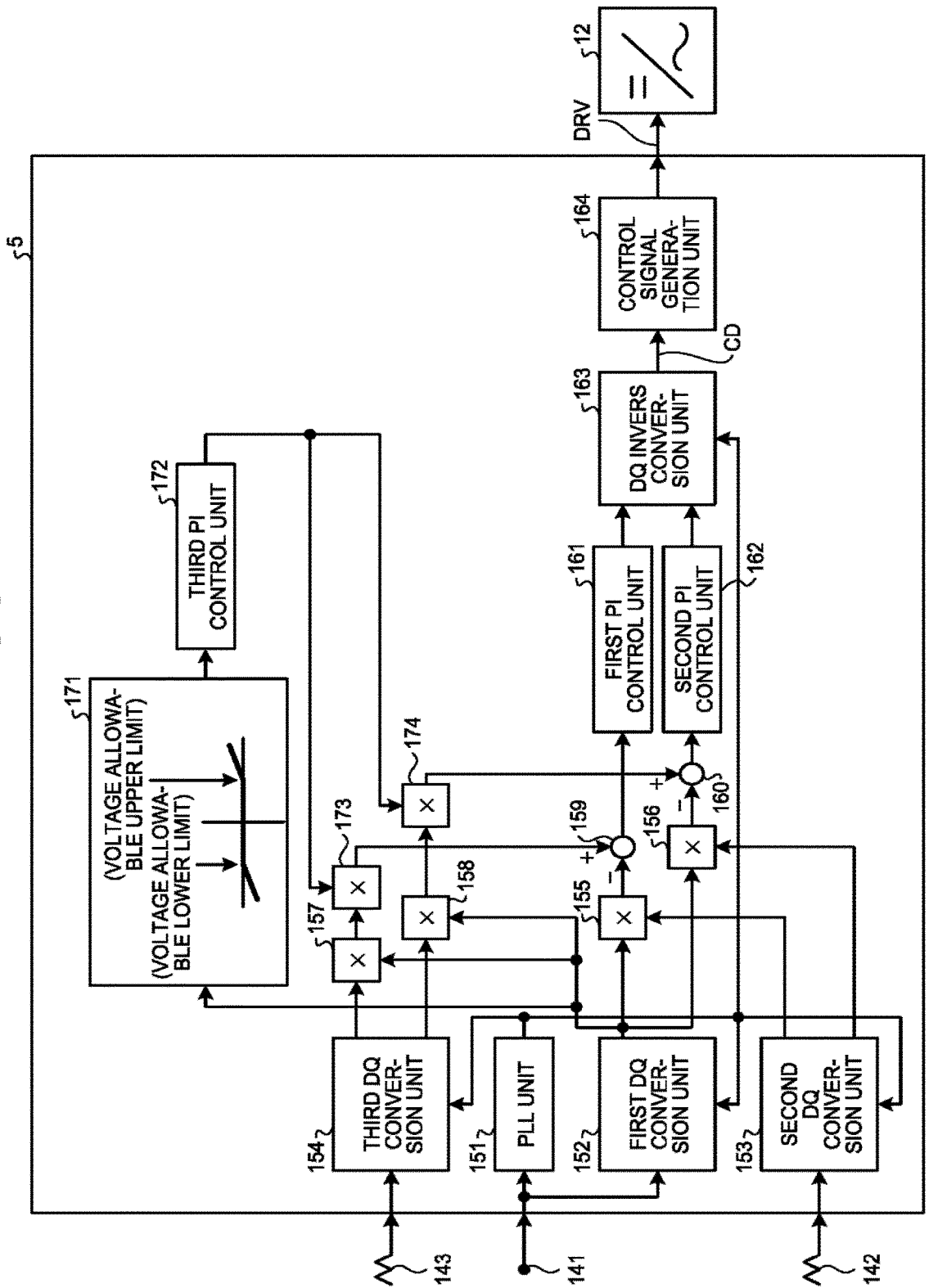

VOLTAGE-FLUCTUATION SUPPRESSION DEVICE AND METHOD

CROSS-REFERENCE TO RELATED APPLICATIONS

This application is national stage application of International Application No. PCT/JP2015/075117, filed Sep. 3, 2015, which designates the United States, incorporated herein by reference in its entirety.

FIELD

Embodiments described herein relate generally to a device and a method for voltage-fluctuation suppression.

BACKGROUND

Recent penetration of solar power generation facilities among general households may cause increases in voltage, abnormalities in frequency, or the like in a power distribution grid (commercial grid) when a number of solar power generation facilities installed rises.

Therefore, a system is proposed for maintaining a voltage or a frequency in a power distribution grid at an appropriate value by distributed arrangement of lower-capacity power storage devices between a power distribution grid and consumers to absorb surplus power at solar power generation facilities by storage batteries.

More specifically, for example, a method is proposed for including a current injection unit that injects an injection current of non-integral multiple order of a fundamental wave in a power distribution grid into the power distribution grid and a proportional computing unit that computes, using a voltage and a current of an injection degree at a connecting point between a voltage-rise suppression device and a power distribution grid, a resistance ($r_1$) and a reactance ($x_1$) of a fundamental wave component in the power distribution grid at the connecting point and a ratio $\alpha_1$ ($=r_1/x_1$) between the resistance $r_1$ and the reactance $x_1$ to generate a reactive power command value from the ratio $\alpha_1$.

However, with a conventional method, an impedance in a power distribution grid is preliminarily measured and the measured resistance and reactance values are used for controlling active and reactive power. Therefore, an additional instrument for measuring an impedance is required, and for example, when a configuration of a power distribution grid is changed, it is necessary to measure an impedance again.

BRIEF DESCRIPTION OF DRAWINGS

FIG. 9 illustrates a second embodiment.

DETAILED DESCRIPTION

According to an embodiment, when a voltage-fluctuation suppression device according to an embodiment suppresses, for input/output of connected power between a first power grid, or a commercial power grid, and a second power grid including a power generation device and grid-connected to the first power grid, voltage fluctuations in the first power grid, a control unit comprises a voltage allowable range computing unit that determines whether a voltage in the first power grid is within a range between predetermined voltage allowable upper and lower limit values, controls a ratio between active and reactive power output by the voltage-fluctuation suppression device to be equal to a ratio between active and reactive power of power flowing between the first and second power grids, and controls, in a case where the voltage in the first power grid is out of the range between the predetermined voltage allowable upper and lower limit values, the ratio between the active and reactive power output by the voltage-fluctuation suppression device to be equal to the ratio between the active and reactive power of power flowing between the first and second power grids.

Next, embodiments will be described with reference to the drawings.

[1] First Embodiment

Figure 1:
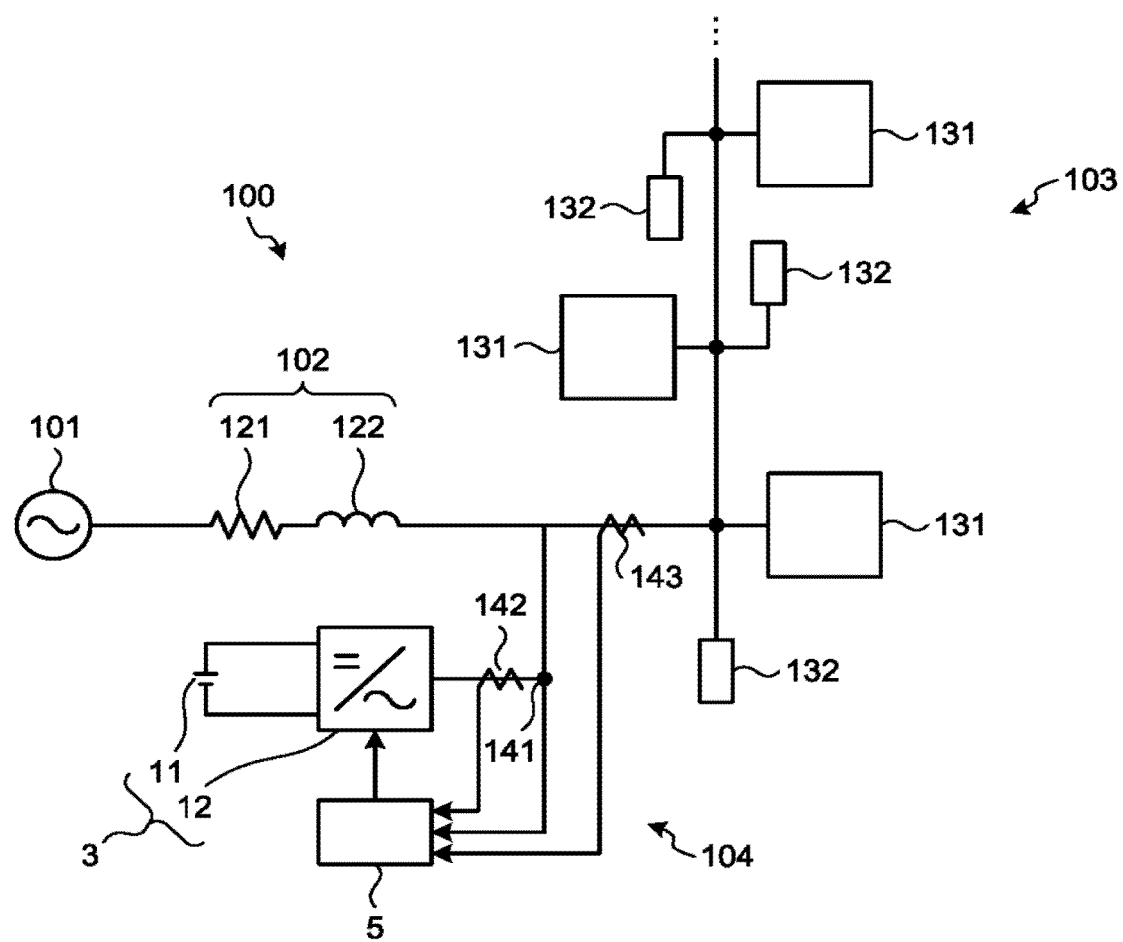
FIG. 1 is a schematic configuration diagram of a power distribution system with a voltage-fluctuation suppression device according to a first embodiment.

FIG. 1 is a schematic configuration diagram of a power distribution system with a voltage-fluctuation suppression device according to a first embodiment.

A power distribution system 100 roughly includes an AC power source 101 as a commercial grid (first power grid) including, for example, power plants and substations, a power distribution grid 102 for distributing AC power supplied from an AC power source, a consumer system 103 as a second power grid including a natural energy power generation device such as a solar power generation device and grid-connected to the AC power source 101 as a commercial grid, and a voltage-fluctuation suppression device 104 for suppressing voltage fluctuations in the power distribution grid 102 for input/output of connected power.

In the configuration above, the power distribution grid 102 can be presented by a resistance 121 and a reactance 122.

In addition, the consumer system 103 includes a plurality of natural energy power generation devices (distributed power sources) 131 arranged in a distributed manner for consumers and a plurality of loads 132.

Furthermore, the voltage-fluctuation suppression device 104 roughly includes a storage battery system 3 and a storage battery controller 5 that controls the storage battery system 3.

Here, the storage battery controller 5 has an AC voltage detector 141, a first AC current detector 142, and a second AC current detector 143 connected.

Additionally, the storage battery controller 5 detects power generated by all of the natural energy power generation devices 131, calculates a fluctuation suppression amount for controlling the storage battery system 3 in order to mitigate effects of the generated power on the power distribution grid 102, and outputs a charge/discharge command to the storage battery system 3.

Figure 2:
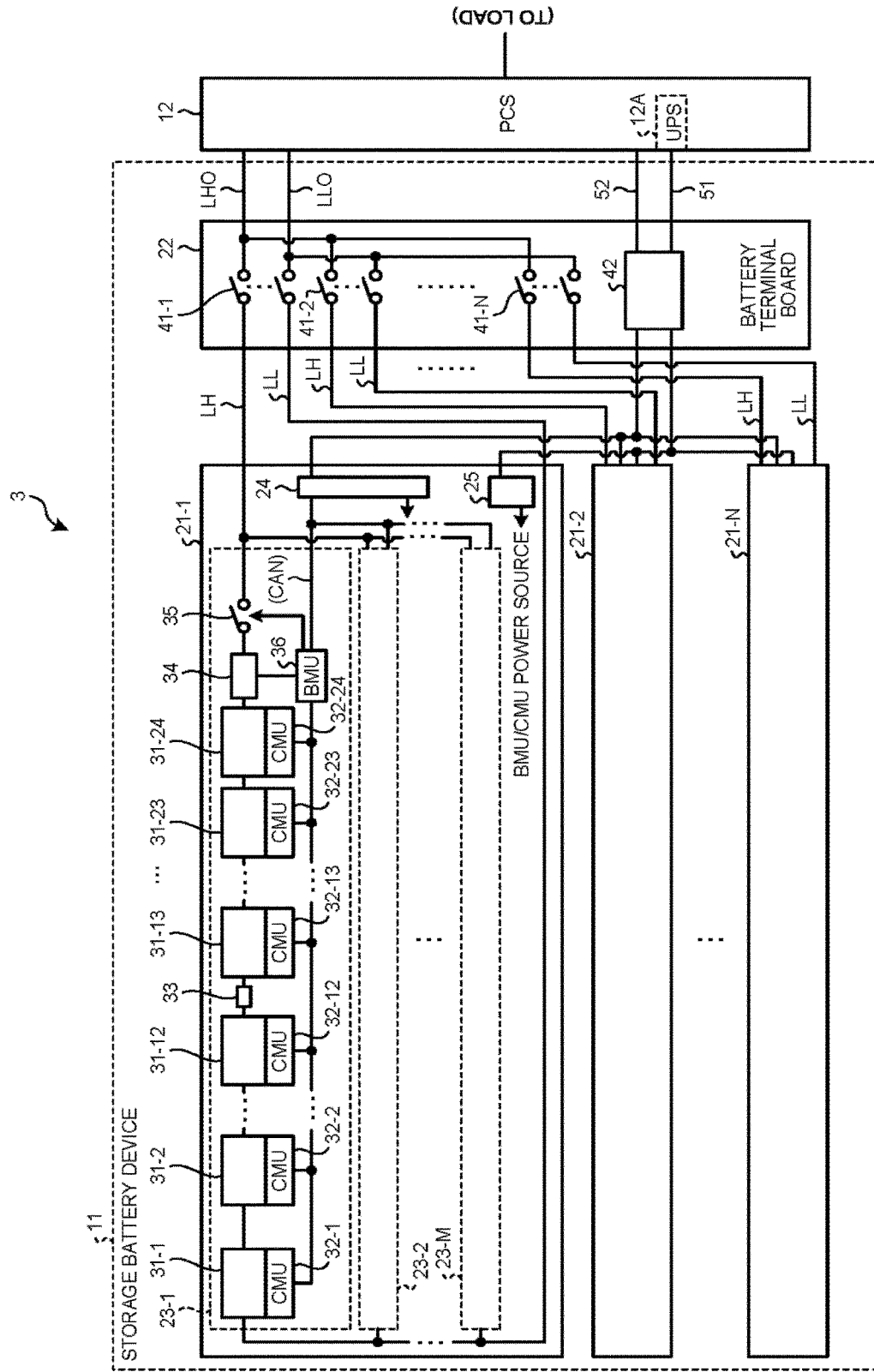
FIG. 2 is a schematic configuration block diagram of a storage battery system according to an embodiment.

FIG. 2 is a schematic configuration block diagram of a storage battery system according to the embodiment.

The storage battery system 3 roughly includes a storage battery device (a power storage device) 11 that stores power and a power conditioning system (PCS) 12 that converts DC power supplied from the storage battery device 11 into AC power with a desired power quality to supply to the loads 132.

The storage battery device 11 roughly includes a plurality of battery board units 21-1-21-N(N is a natural number) and a battery terminal board 22 with the battery board units 21-1-21-N connected.

The battery board units 21-1-21-N include a plurality of battery boards 23-1-23-M (M is a natural number) mutually connected in parallel, a gateway device 24, and a DC power supply device 25 that supplies DC power for operation to a battery management unit (BMU) described later and cell monitoring units (CMUs).

Here, a configuration of the battery boards 23-1-23-M will be described.

Each of the battery boards 23-1-23-M is connected via a high-potential side power supply line LH and a low-potential side power supply line LL to output power supply lines (buses) LHO and LLO and supplies power to the power conditioning system 12, or a main circuit.

The battery boards 23-1-23-M have identical configurations, and thus, the battery board 23-1 will be described as an example.

The battery board 23-1 roughly includes a plurality of cell modules 31-1-31-24 (24 in FIG. 2), a plurality of CMUs 32-1-32-24 (24 in FIG. 2) provided respectively to the cell modules 31-1-31-24, a service disconnect 33 provided between the cell modules 31-12 and 31-13, a current sensor 34, and a contactor 35. The cell modules 31-1-31-24, the service disconnect 33, the current sensor 34, and the contactor 35 are connected in series.

Here, the cell modules 31-1-31-24 form a battery pack with a plurality of battery cells connected in series-parallel. In addition, the cell modules 31-1-31-24 connected in series form a battery pack group.

Furthermore, the battery board 23-1 includes a BMU 36, and a communication line of each of the CMUs 32-1-32-24 and an output line of the current sensor 34 are connected to the BMU 36.

The BMU 36 controls the entire battery board 23-1 under control of the gateway device 24, and controls open/close of the contactor 35 based on a result of communication with each of the CMUs 32-1-32-24 (voltage and temperature data described later) and a result of detection by the current sensor 34.

Next, a configuration of the battery terminal board 22 will be described.

The battery terminal board 22 includes a plurality of board breakers 41-1-41-N correspondingly provided to the battery board units 21-1-21-N and a master device 42 configured as a microcomputer that controls the entire storage battery device 11.

Between the master device 42 and the power conditioning system 12, a control power supply line 51 supplied via an uninterruptible power system (UPS) 12A of the power conditioning system 12 and a control communication line 52 that is configured as Ethernet (registered trademark) and exchanges control data are connected.

Here, a detailed configuration of the cell modules 31-1-31-24, the CMUs 32-1-32-24, and the BMU 36 will be described.

Figure 3:
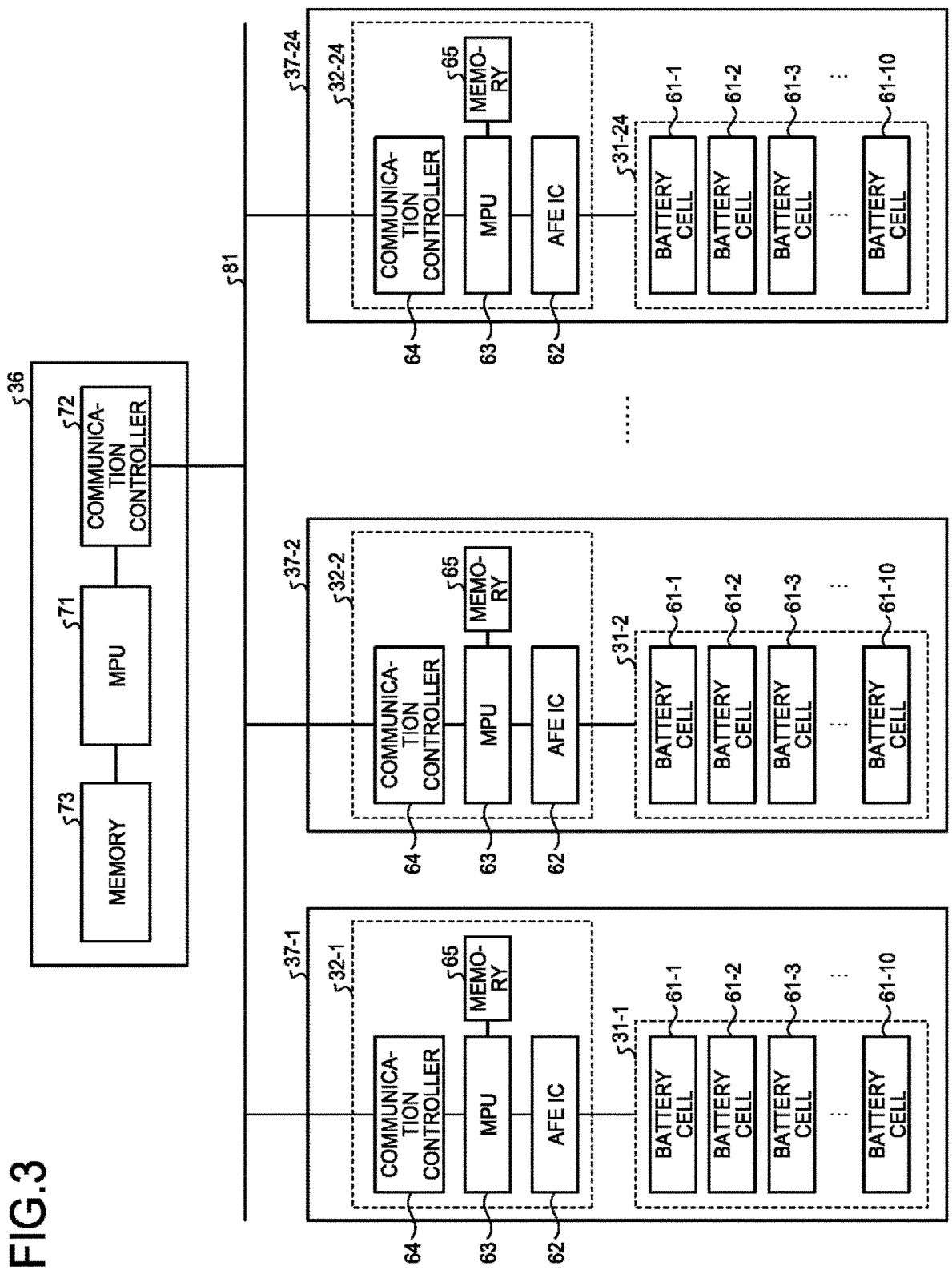
FIG. 3 illustrates a detailed configuration of cell modules, CMUs, and BMUs.

FIG. 3 illustrates a detailed configuration of the cell modules, the CMUs, and the BMU.

The cell modules 31-1-31-24 each include a plurality of battery cells 61-1-61-10 (10 in FIG. 3) connected in series.

The CMUs 32-1-32-24 include analog front end ICs (AFE-ICs) 62 for measuring currents and voltages, and temperatures at prescribed points of the battery cells 61-1-61-10 included in the corresponding cell modules 31-1-31-24, MPUs 63 that control the entire corresponding CMUs 32-1-32-24, communication controllers 64 in accordance with a controller area network (CAN) standard for CAN communication with the BMU 36, and memories 65 that store voltage data equivalent to voltage for each cell and temperature data.

In the description below, a combined configuration of each of the cell modules 31-1-31-24 and the corresponding CMUs 32-1-32-24 is called battery modules 37-1-37-24. For example, a combined configuration of the cell module 31-1 and the corresponding CMU 32-1 is called the battery module 37-1.

In addition, the BMU 36 includes an MPU 71 that controls the entire BMU 36, a communication controller 72 in accordance with the CAN standard for CAN communication with the CMUs 32-1-32-24, and a memory 73 that stores voltage and temperature data sent from the CMUs 32-1-32-24.

Figure 4:
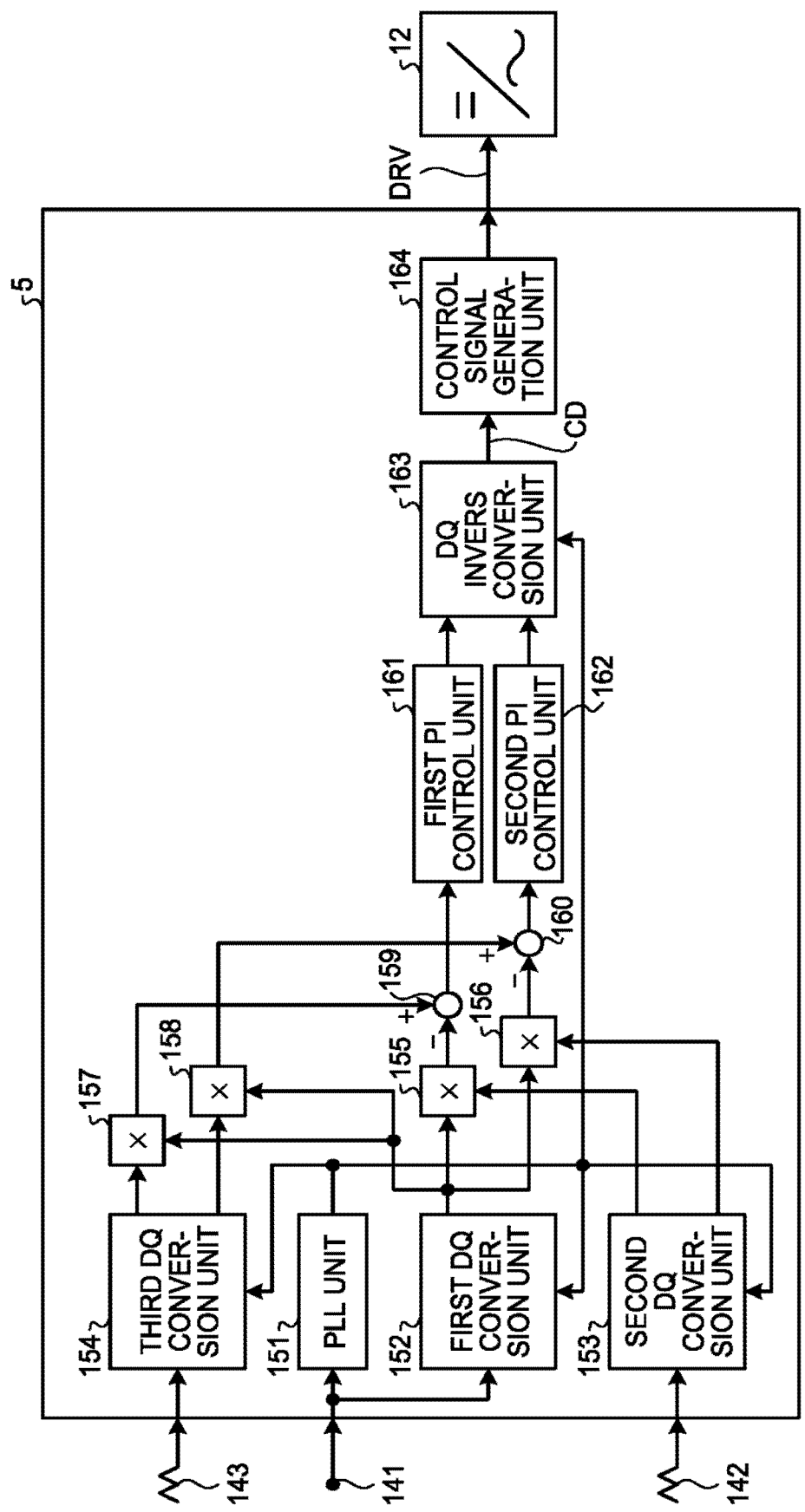
FIG. 4 is a functional block diagram of a storage battery controller.

FIG. 4 is a functional block diagram of a storage battery controller.

The storage battery controller 5 roughly includes a PLL unit 151, a first DQ conversion unit 152, a second DQ conversion unit 153, a third DQ conversion unit 154, a first multiplier 155, a second multiplier 156, a third multiplier 157, a fourth multiplier 158, a first subtractor 159, a second subtractor 160, a first proportional integral (PI) control unit 161, a second PI control unit 162, a DQ inverse conversion unit 163, and a control signal generation unit 164.

In the configuration above, the PLL unit 151 computes a phase signal based on a voltage signal detected by the AC voltage detector 141 to output to the first DQ conversion unit 152, the second DQ conversion unit 153, the third DQ conversion unit 154, and the DQ inverse conversion unit 163.

The first DQ conversion unit 152 converts, based on the AC voltage signal (=AC voltage information) detected by the AC voltage detector 141 and the phase signal output by the PLL unit 151, the AC voltage information into DC active and reactive voltage information.

The second DQ conversion unit 153 converts, based on an AC current signal (=first AC current information) detected by the first AC current detector 142 and the phase signal output by the PLL unit 151, the first AC current information into first DC active and reactive current information.

The third DQ conversion unit 154 converts, based on an AC current signal (=second AC current information) detected by the second AC current detector 143 and the phase signal output by the PLL unit 151, the second AC current information, or AC current information of the power distribution grid 102, into second DC active and reactive current information.

The first multiplier 155 multiplies the active voltage information output by the first DQ conversion unit 152 by the first active current information output by the second DQ conversion unit 153 to output first active power information.

The second multiplier 156 multiplies the reactive voltage information output by the first DQ conversion unit 152 by the first reactive current information output by the second DQ conversion unit 153 to output first reactive power information.

The third multiplier 157 multiplies the active voltage information output by the first DQ conversion unit 152 by the second active current information output by the third DQ conversion unit 154 to output second active power information.

The fourth multiplier 158 multiplies the reactive voltage information output by the first DQ conversion unit 152 by the second reactive current information output by the third DQ conversion unit 154 to output second reactive power information.

The first subtractor 159 subtracts the first active power information output by the first multiplier 155 from the second active power information output by the third multiplier 157 to output difference active power information.

The second subtractor 160 subtracts the first reactive power information output by the second multiplier 156 from the second reactive power information output by the fourth multiplier 158 to output difference reactive power information.

The first PI control unit 161 controls and outputs, with the difference active power information, or an output of the first subtractor 159, as an input signal, first proportional and integrated values such that the difference becomes smaller.

The second PI control unit 162 controls and outputs, with the difference reactive power information, or an output of the second subtractor 160, as an input signal, second proportional and integrated values such that the difference becomes smaller.

The DQ inverse conversion unit 163 generates an AC control signal CD that controls the power conditioning system 12 to output to the control signal generation unit 164 based on output signals of the first PI control unit 161 and the second PI control unit 162 and the phase signal output by the PLL unit 151.

The control signal generation unit 164 generates a PWM signal based on the input AC control signal CD to output to the power conditioning system 12 as a driving signal DRV that drives semiconductor elements.

In the configuration above, in a case where generated power by each natural energy power generation device 131 is larger than consumed power by each load 132, current flows from the natural energy power generation device 131 to the AC power source 101, and a terminal voltage in the natural energy power generation device 131 increases higher than a voltage of the AC power source 101 due to the resistance 121 and the reactance 122 in the power distribution grid 102.

Conversely, in a case where generated power by the natural energy power generation device 131 is smaller than consumed power by the load 132, current flows from the AC power source 101 to the load 132, and the terminal voltage in the natural energy power generation device 131 declines below the voltage of the AC power source 101.

In addition, the storage battery device 11 is connected to a DC side of the power conditioning system 12, an AC side of which is connected to the power distribution grid 102. In the power conditioning system 12, DC power of the storage battery device 11 is converted into AC power to be discharged to or charged from the power distribution grid 102.

The AC voltage detector 141 detects an output voltage from the power conditioning system 12 to the power distribution grid 102, and ideally detects and controls a voltage at a point where a voltage is drawn from the power distribution grid 102 into the power conditioning system 12. However, in a case where the AC side of the power conditioning system 12 is close to a point where a voltage is drawn with no potential difference generated therebetween, it is possible to detect a voltage on the AC side of the power conditioning system 12 to regard as a voltage in the power distribution grid 102.

Furthermore, the first AC current detector 142 detects an AC current in the power conditioning system 12, while the second AC current detector 143 detects a current flowing from a connecting point between the AC side of the power conditioning system 12 and the power distribution grid 102 to the natural energy power generation device 131 and the load 132.

Detected signals from the AC voltage detector 141, the first AC current detector 142, and the second AC current detector 143 are output to the storage battery controller 5 to control the power conditioning system 12.

Figure 5:
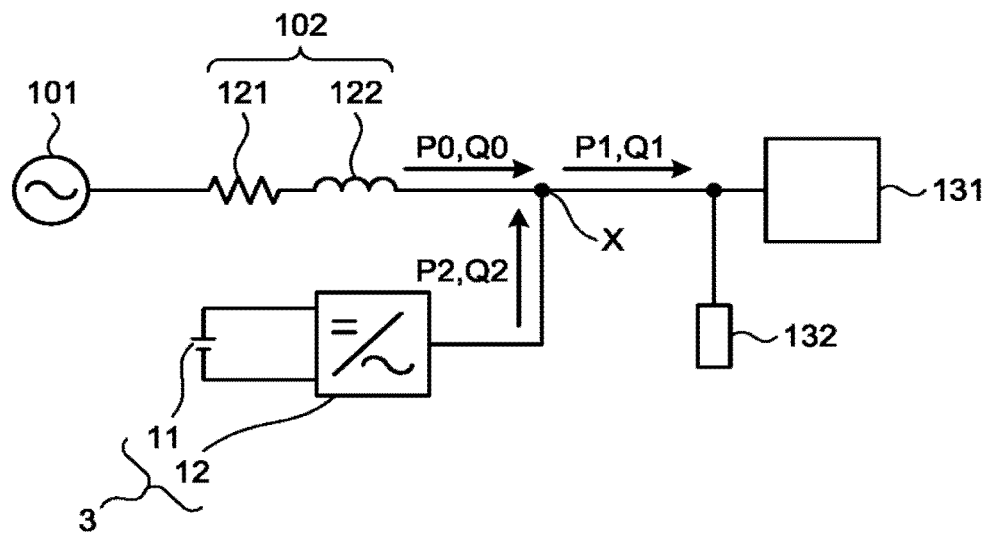
FIG. 5 illustrates a power flow based on a connecting point between a power conditioning system and a power distribution grid.

FIG. 5 illustrates a power flow based on a connecting point between a power conditioning system and a power distribution grid.

In the description below, active and reactive power flowing from the AC power source 101 to a connecting point X are P0 and Q0, respectively, active and reactive power flowing from the connecting point X to the natural energy power generation device 131 and the load 132 are P1 and Q1, respectively, and active and reactive power flowing from the storage battery system 3 to the connecting point X are P2 and Q2, respectively.

In this case, when the power conditioning system 12 is stopped, P0=P1 and Q0=Q1.

When the control illustrated in FIG. 4 functions, it is possible that P2=P1 and Q2=Q1. As a result, power flowing from the AC power source 101 to the connecting point X can be P0=0 and Q0=0. In other words, despite the configuration of the power distribution grid 102, active and reactive power can be controlled.

Figure 6:
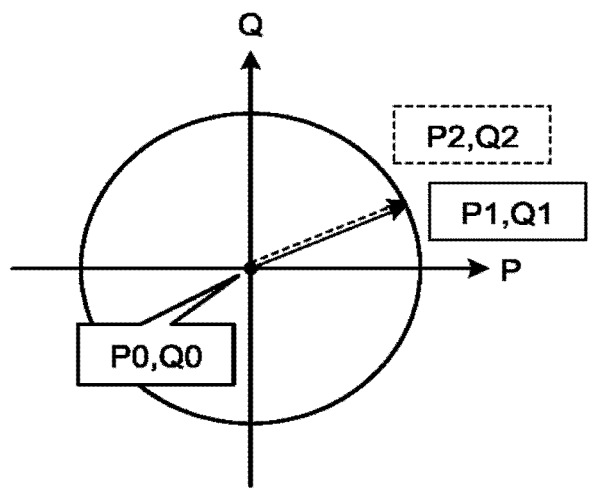
FIG. 6 is a vector diagram of power.

FIG. 6 is a vector diagram of power.

As described above, when active and reactive power to the natural energy power generation device 131 and the load 132 can be output from the power conditioning system 12, output power from the AC power source 101 is P0=0 and Q1=0.

At this time, no current effectively flows into the resistance 121 and the reactance 122 in the power distribution grid 102. Therefore, in the power distribution grid 102, values of transmission end voltage of the AC power source 101 and voltage at the connecting point X are identical without potential difference.

Consequently, the voltage at the connecting point X is identical to the voltage of the AC power source 101, and thus, voltage fluctuations at the connecting point X can be suppressed with no influence by the resistance 121 or the reactance 122 in the power distribution grid 102.

That is, according to the first embodiment, it is possible to suppress voltage fluctuations in a power distribution grid by appropriately controlling active and reactive power without measurement of an impedance in the power distribution grid through adjustment to a power distribution grid actually operated.

Here, effects of the first embodiment will be described more specifically.

Figure 7:
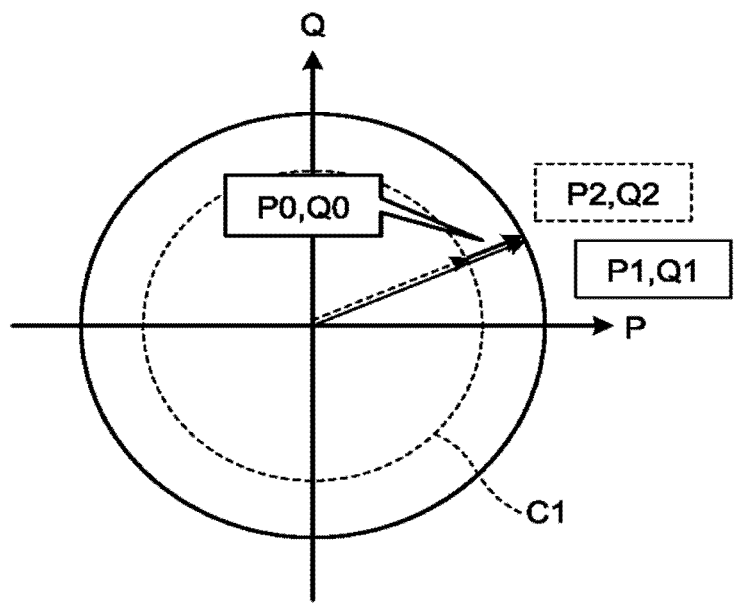
FIG. 7 is a specific vector diagram of power based on a connecting point X.

FIG. 7 is a specific vector diagram of power based on the connecting point X.

In FIG. 7, a dashed line circle C1 indicates a rating capacity of the power conditioning system 12. In a case where a vector sum of the active power P1 and the reactive power Q1 to the natural energy power generation device 131 and the load 132, represented by a formula (1) is larger than a vector sum of the active power P2 and the reactive power Q2 of the rating capacity the power conditioning system 12 can output, represented by a formula (2), a ratio between the active and reactive power output by the power conditioning system 12 is made equal to a ratio between the active power P1 and the reactive power Q1 (=P1/Q1) to the natural energy power generation device 131 and the load 132.

$$\sqrt{(P1)^2+(Q1)^2} \quad (1)$$

$$\sqrt{(P2)^2+(Q2)^2} \quad (2)$$

As a result, a ratio between the active power P0 of the AC power source 101 derived by subtracting the active power P2 output by the power conditioning system 12 from the active power P1 to the natural energy power generation device 131 and the load 132 and the reactive power Q0 of the AC power source 101 derived by subtracting the reactive power Q2 output by the power conditioning system 12 from the reactive power Q1 to the natural energy power generation device 131 and the load 132 is equal to the ratio between the active power P1 and the reactive power Q1 to the natural energy power generation device 131 and the load 132.

At this time, a vector sum of the active power P0 and the reactive power Q0 of the AC power source 101, represented by a formula (3) is minimum.

$$\sqrt{(P0)^2+(Q0)^2} \quad (3)$$

Figure 8:
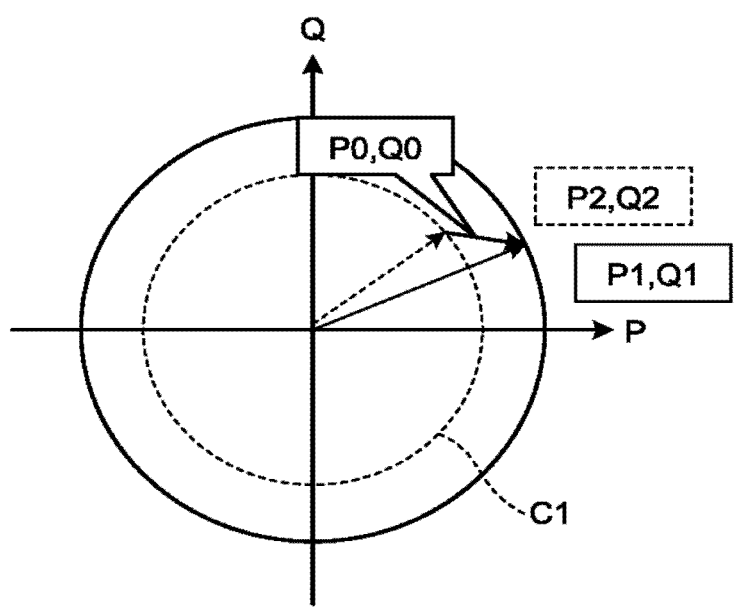
FIG. 8 is a vector diagram of power based on a connecting point X in a case where a ratio between active and reactive power output by a power conditioning system is not equal to a ratio between active and reactive power to a natural energy power generation device and a load.

FIG. 8 is a vector diagram of power based on the connecting point X in a case where a ratio between active and reactive power output by a power conditioning system is not equal to a ratio between active and reactive power to a natural energy power generation device and a load.

As illustrated in FIG. 8, in a case where the ratio between the active and reactive power output by the power conditioning system 12 is not equal to the ratio between the active power P1 and the reactive power Q1 to the natural energy power generation device 131 and the load 132, the vector sum of the active power P0 and the reactive power Q0 of the AC power source 101, represented by a formula (4) is large compared with the vector sum of the active power P0 and the reactive power Q0 of the AC power source 101 illustrated in FIG. 7.

$$\sqrt{(P0)^2+(Q0)^2} \quad (4)$$

In other words, it can be recognized that the vector sum of the active power P0 and the reactive power Q0 of the AC power source 101, represented by a formula (5) becomes minimum by making a ratio between the active power P2 and the reactive power Q2 output by the power conditioning system 12 equal to the ratio between the active power P1 and the reactive power Q1 to the natural energy power generation device 131 and the load 132.

$$\sqrt{(P0)^2+(Q0)^2} \quad (5)$$

Thus, with the configuration of the first embodiment, a power source current output from the AC power source 101 becomes smaller, and voltage fluctuations at a connecting point determined by multiplying a power source current and the resistance 121 and the reactance 122 can be made minimum.

This can minimize output power from the AC power source to suppress voltage fluctuations at the connecting point X to a minimum.

[2] Second Embodiment

FIG. 9 illustrates a second embodiment.
In FIG. 9, sections similar to those in FIG. 4 bear identical signs.

The second embodiment is different from the first embodiment in that the second embodiment includes a voltage allowable range computing unit 171, a third PI control unit 172, a fifth multiplier 173, and a sixth multiplier 174. The voltage allowable range computing unit 171 outputs zero in a case where a grid voltage is within a range between voltage allowable upper and lower limits, proportionally increases output in a case where a voltage allowable upper limit is exceeded, or proportionally decreases output in a case where a voltage allowable lower limit is exceeded. The third PI control unit 172 controls to output, with the output of the voltage allowable range computing unit 171 as an input signal, third proportional and integrated values such that the output becomes smaller. The fifth multiplier 173 multiplies second active power information output by a third multiplier 157 by the third proportional and integrated values output by the third PI control unit 172 to output third active power information to a first subtractor 159. The sixth multiplier 174 multiplies second reactive power information output by a fourth multiplier 158 by the third proportional and integrated values output by the third PI control unit 172 to output third reactive power information to a second subtractor 160.

In the configuration above, the voltage allowable range computing unit 171 has active voltage information computed by a first DQ conversion unit 152 input. In a case where a value of the active voltage information is larger than a predetermined voltage allowable upper limit value, a value derived by subtracting the voltage allowable upper limit value from the value of the active voltage information is output, and in a case where the value of the active voltage information is smaller than a predetermined voltage allowable lower limit value, a value derived by subtracting the voltage allowable lower limit value from the value of the active voltage information is output.

The third PI control unit 172 controls and outputs the third proportional and integrated values based on the output of the voltage allowable range computing unit 171.

The fifth multiplier 173 multiplies the third proportional and integrated values, or outputs of the third PI control unit 172, by the output of the third multiplier 157 to output the third active power information.

The sixth multiplier 174 multiplies the third proportional and integrated values, or outputs of the third PI control unit 172, by the output of the fourth multiplier 158 to output the third reactive power information.

The new information, the third active and reactive power information, is derived by only multiplying active and reactive power flowing from a connecting point X of a power distribution grid 102 to a natural energy power generation device 131 and a load 132 by a fixed value. Therefore, a ratio between active and reactive power commands is equal to a ratio between active and reactive power flowing from a connecting point of a power distribution grid to a distributed power source and a load.

Thus, a power conditioning system 12 operates to maintain a voltage allowable upper limit value when a voltage allowable upper limit of a grid voltage is exceeded, and a voltage allowable lower limit when a voltage allowable lower limit of a voltage in the power distribution grid 102 is exceeded.

At this time, active and reactive power outputs of the power conditioning system 12 are equal to a ratio between active and reactive power flowing from a connecting point to a distributed power source and a load. Therefore, output power from an AC power source is also equal to the ratio between active and reactive power flowing to the distributed power source and the load.

Thus, according to the second embodiment, in a case where a voltage allowable upper limit or a voltage allowable lower limit of a grid voltage is exceeded, voltage fluctuations at the connecting point X can be suppressed within a range between voltage allowable lower and upper limit values.

As described above, according to the above embodiments, it is possible to suppress voltage fluctuations in a power distribution grid by appropriately controlling active and reactive power without measurement of an impedance in the power distribution grid through adjustment to a power distribution grid actually operated.

Some embodiments of the present invention have been described, but these embodiments are presented as examples and are not intended to limit the scope of the invention. These new embodiments can be implemented in other various forms, and various types of omissions, substitutions, or changes can be made without impeding from the spirit of the invention. These embodiments and their modifications fall within the scope and spirit of the invention and are included in the invention provided in the claims and the scope of equivalents thereof.

For example, in the descriptions above, the power conditioning system 12 is configured to be controlled by the storage battery controller 5, but may be configured to be controlled by an unillustrated upper level control device that controls a plurality of storage battery controllers 5 or by the power conditioning system 12 itself, or may be configured to be arranged in each unit in a distributed manner.

Furthermore, in the descriptions above, descriptions of a power distribution grid have been given, but may be applied in a power grid aimed for transmission, and either a three-phase grid or a single-phase grid can control a power conditioning system with a similar idea.

The invention claimed is:

1. A voltage-fluctuation suppression device that suppresses, for input/output of connected power between a first power grid, or a commercial power grid, and a second power grid including a power generation device and grid-connected to the first power grid, voltage fluctuations in the first power grid, the voltage-fluctuation suppression device comprising:
    a control unit that comprises a voltage allowable range computing unit that determines whether a voltage in the first power grid is within a range between predetermined voltage allowable upper and lower limit values, controls a ratio between active and reactive power output by the voltage-fluctuation suppression device to be equal to a ratio between active and reactive power of power flowing between the first and second power grids, and controls, in a case where the voltage in the first power grid is out of the range between the predetermined voltage allowable upper and lower limit values, the ratio between the active and reactive power output by the voltage-fluctuation suppression device to be equal to the ratio between the active and reactive power of power flowing between the first and second power grids;
    a storage battery device;
    a power conditioning system that carries out power conditioning between stored power in the storage battery device and the connected power and inputs/outputs power via a connecting point with the first power grid;
    a first current detection unit that detects a first current flowing from the first power grid to the second power grid;
    a voltage detection unit that detects a voltage at the connecting point; and
    a second current detection unit that detects a second current flowing between the connecting point and the power conditioning system, wherein
    the control unit comprises a first computing unit that calculates first active and reactive power based on the first current and the voltage at the connecting point, and
    a second computing unit that calculates second active and reactive power based on the second current and the voltage at the connecting point, and
    controls the power conditioning system through proportional integral control based on a difference between the first and second active power and a difference between the first and second reactive power to make the ratio between the active and reactive power output by the voltage-fluctuation suppression device equal to the ratio between the active and reactive power of power flowing between the first and second power grids.

2. The voltage-fluctuation suppression device according to claim 1, wherein
    the control unit controls, for input/output of the connected power, in a case where a vector sum of active and reactive power to be supplied to the second power grid is smaller than a vector sum of active and reactive power the voltage-fluctuation suppression device is capable of outputting, a vector sum of active and reactive power output by the voltage-fluctuation suppression device to be equal to the vector sum of active and reactive power to be supplied to the second power grid.

3. The voltage-fluctuation suppression device according to claim 1, wherein the control unit proportionally increases output power in a case where the voltage in the first power grid exceeds the voltage allowable upper limit value, or proportionally decreases output power in a case where the voltage allowable lower limit value is exceeded.

4. A method implemented by a voltage-fluctuation suppression device that suppresses, for input/output of connected power between a first power grid, or a commercial power grid, and a second power grid including a power generation device and grid-connected to the first power grid, voltage fluctuations in the first power grid and comprises a storage battery device and a power conditioning system that carries out power conditioning between stored power in the storage battery device and the connected power to input/output power via a connecting point with the first power grid, the method comprising the steps of:
    detecting a first current flowing from the first power grid to the second power grid;
    detecting a voltage at the connecting point with the first power grid;
    detecting a second current flowing between the connecting point and the power conditioning system;
    determining whether a voltage in the first power grid is within a range between predetermined voltage allowable upper and lower limit values; and
    controlling, based on the first current, the voltage, and the second current, a ratio between active and reactive power output by the voltage-fluctuation suppression device to be equal to a ratio between active and reactive power of power flowing between the first and second power grids and controlling, in a case where the voltage in the first power grid is out of the range between the predetermined voltage allowable upper and lower limit values, the ratio between the active and reactive power output by the voltage-fluctuation suppression device to be equal to the ratio between the active and reactive power of power flowing between the first and second power grids, wherein the controlling further controls, for input/output of the connected power, in a case where a vector sum of active and reactive power to be supplied to the second power grid is smaller than a vector sum of active and reactive power the voltage-fluctuation suppression device is capable of outputting, a vector sum of active and reactive power output by the voltage-fluctuation suppression device to be equal to the vector sum of active and reactive power to be supplied to the second power grid.

\* \* \* \* \*